United States Patent [19]
Fellows

[11] Patent Number: 5,484,218
[45] Date of Patent: Jan. 16, 1996

[54] PROTECTIVE COVER FOR A BALL JOINT ASSEMBLY

[75] Inventor: Russell T. Fellows, Mt. Clemens, Mich.

[73] Assignee: TRW Inc., Lyndhurst, Ohio

[21] Appl. No.: 170,015

[22] Filed: Dec. 20, 1993

[51] Int. Cl.⁶ .................... F16C 11/06; B62D 7/16
[52] U.S. Cl. ................ 403/12; 403/2; 403/119; 277/212 FB
[58] Field of Search .............. 277/212 FB, 212 R; 411/377, 374, 373, 372, 431, 429, 432; 403/11, 134, 122, 119, 23, 2, 315

[56] References Cited

U.S. PATENT DOCUMENTS

| | | | |
|---|---|---|---|
| 1,368,723 | 2/1921 | Helvig | 411/372 X |
| 3,199,902 | 8/1965 | Fierstine. | |
| 3,598,434 | 8/1971 | Patton et al. | |
| 4,552,480 | 11/1985 | McIntyre. | |
| 4,750,878 | 6/1988 | Nix et al. | 411/377 X |
| 4,848,950 | 7/1989 | Haberstroh. | |
| 5,066,159 | 11/1991 | Urbach | 403/134 |
| 5,100,254 | 3/1992 | Wasada | 403/134 |
| 5,312,300 | 5/1994 | McGregor et al. | 464/175 |
| 5,413,431 | 5/1995 | Fellows | 403/12 |

FOREIGN PATENT DOCUMENTS 636531  3/1962  Italy ........................ 411/377

*Primary Examiner*—Anthony Knight
*Attorney, Agent, or Firm*—Tarolli, Sundheim & Covell

[57] ABSTRACT

A protective cover for a threaded stud of a ball joint assembly includes retaining elements for engaging a stud of the ball joint assembly. The retaining elements are movable from a position engaging the stud to prevent removal of the cover from the ball joint assembly to a position in which the retaining elements are spaced from the stud to permit removal of the cover from the ball joint. A removable cap prevents the retaining elements from moving from the position in which they engage the stud. The cap is removable from the cover in response to axial movement of the cover relative to the ball joint. Once the cap is removed, deformable wall portions which interconnect the retaining elements can be pressed toward each other to move the retaining elements out of engagement with the stud to permit removal of the cover from the ball joint.

13 Claims, 3 Drawing Sheets

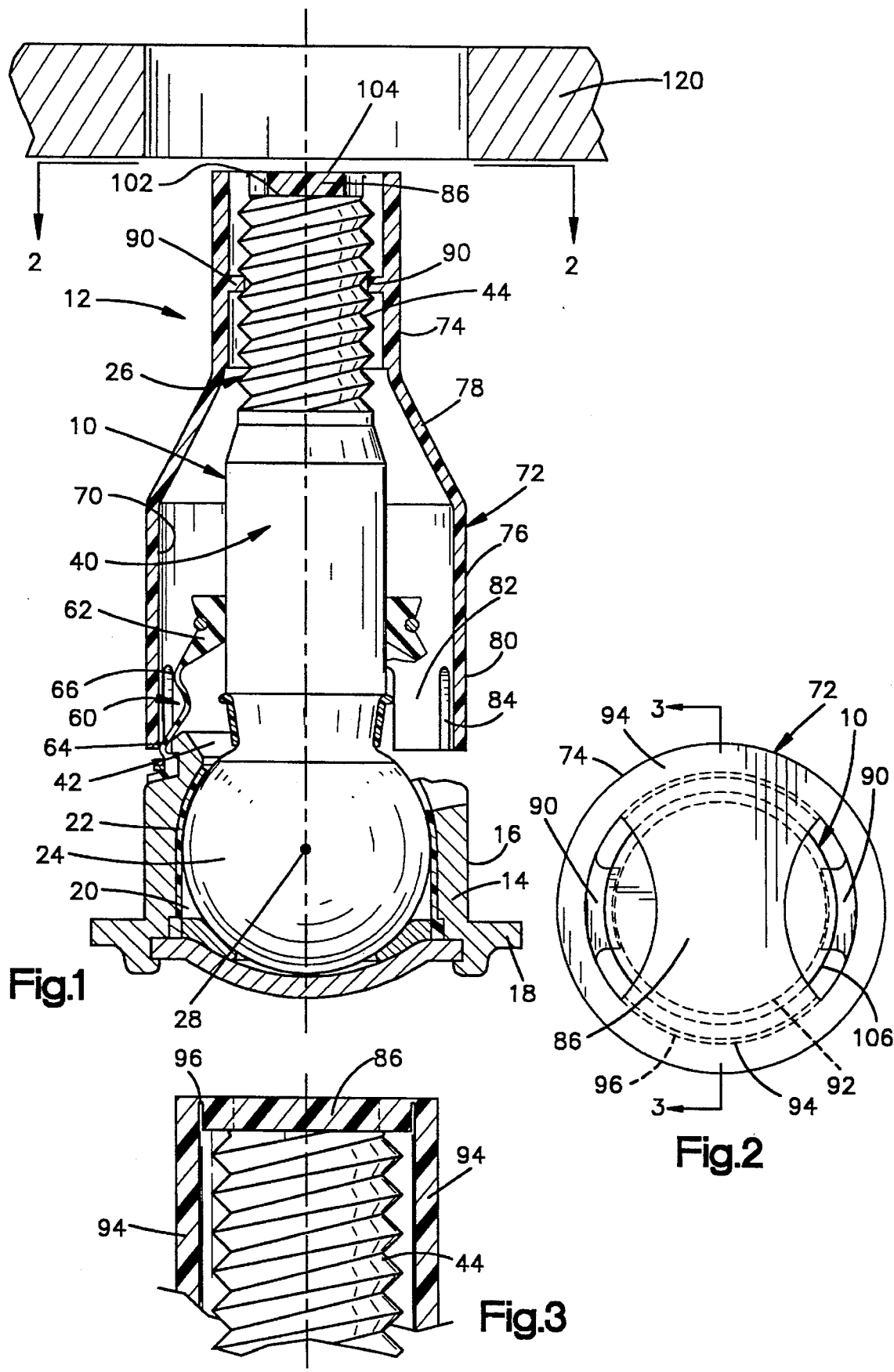

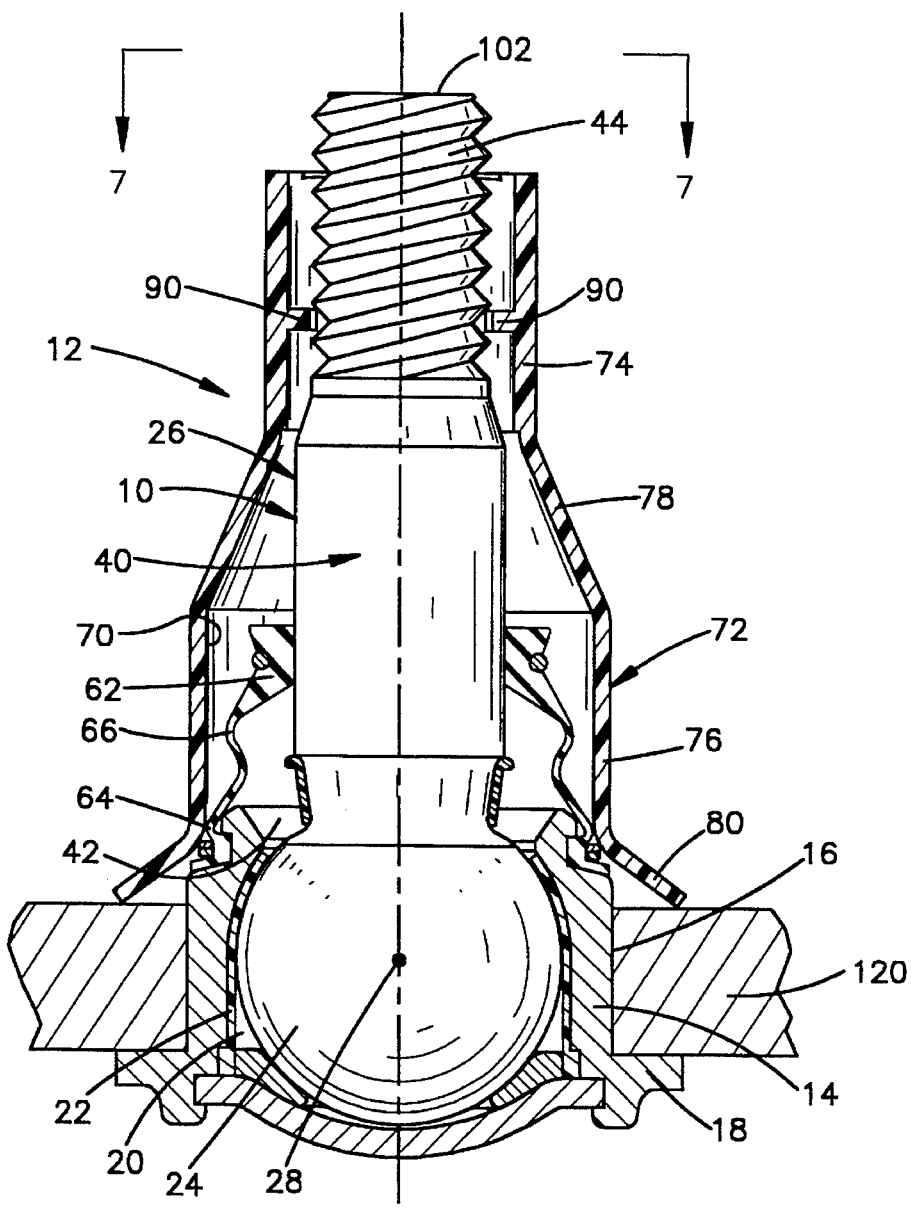
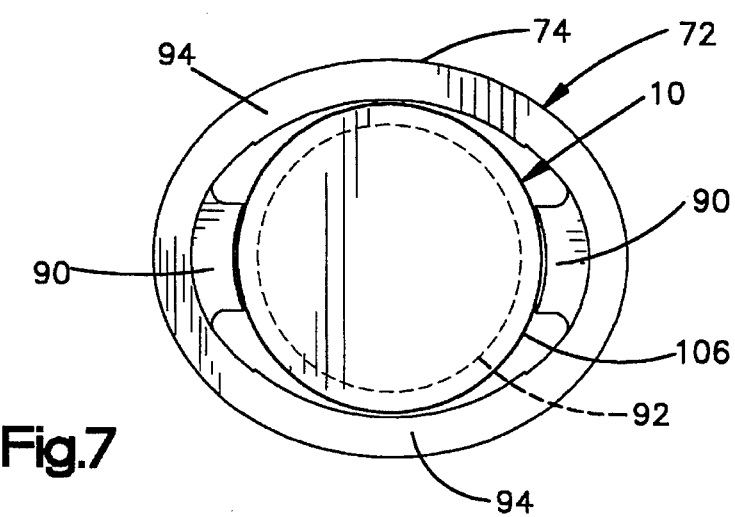
Fig.6
Fig.7

5,484,218

PROTECTIVE COVER FOR A BALL JOINT ASSEMBLY

BACKGROUND OF THE INVENTION

The present invention relates to a protective cover for a threaded stud and more particularly to the threaded stud of a ball joint assembly.

Ball joint assemblies usually are subjected to extensive handling after manufacture. For example, many joint assemblies are commonly manufactured at one location and shipped to another location for installation in a vehicle. In a typical example, a ball joint is assembled into a suspension control arm. The suspension control arm with the ball joint are then assembled into a vehicle. U.S. Pat. No. 3,598,434 discloses a cover which may be used to protect the ball joint assembly, especially the threaded stud, prior to and during assembly into the control arm and during subsequent handling. The cover is removed preferably immediately prior to assembly of the control arm into a vehicle. However, the cover may fall off of the ball joint assembly during handling of the ball joint assembly.

SUMMARY OF THE INVENTION

An improved protective cover for a ball joint assembly includes a structure for maintaining the cover on the ball joint assembly during handling of the ball joint assembly and for permitting easy removal of the protective cover at the appropriate time.

The improved protective cover includes a generally cylindrical sidewall and cap which enclose a threaded stud of the ball joint assembly. A pair of retaining elements extend radially inward from the sidewall and resiliently engage the stud to prevent removal of the cover from the ball joint assembly. The retaining elements are interconnected by two deformable wall portions of the sidewall. Upon movement of the deformable wall portions toward each other, the retaining elements move away from each other and out of engagement with the stud. When the cap is removed, the deformable wall portions may be moved toward each other and the cover may be removed from the ball joint assembly. The deformable wall portions are movable toward each other upon the application of radially inwardly directed forces to the deformable wall portions. The cap prevents movement of the deformable wall portions toward each other and thus prevents the retaining elements from movement from a position engaging the stud to a position in which the retaining elements are spaced from the stud. The cap is removable from the cover in response to axial movement of the cover relative to the ball joint assembly.

BRIEF DESCRIPTION OF THE DRAWINGS

Further features of the present invention will become apparent to those skilled in the art to which the present invention relates from reading the following specification with reference to the accompanying drawings, in which:

FIG. 1 is a view, partially in section, of a ball joint assembly enclosed by a protective cover;

FIG. 2 is an enlarged view of an end of the protective cover of FIG. 1 taken along the lines 2—2 of FIG. 1;

FIG. 3 is a view partially in section, taken along the lines 3—3 of FIG. 2;

FIG. 6 is a sectional view, similar to FIGS. 1 and 4, illustrating the protective cover in a position for removal from the ball joint assembly; and FIG. 7 is an enlarged view of the end of the protective cover, similar to FIGS. 2 and 5, taken along the lines 7—7 of FIG. 6.

DESCRIPTION OF A PREFERRED EMBODIMENT

Figure 4:
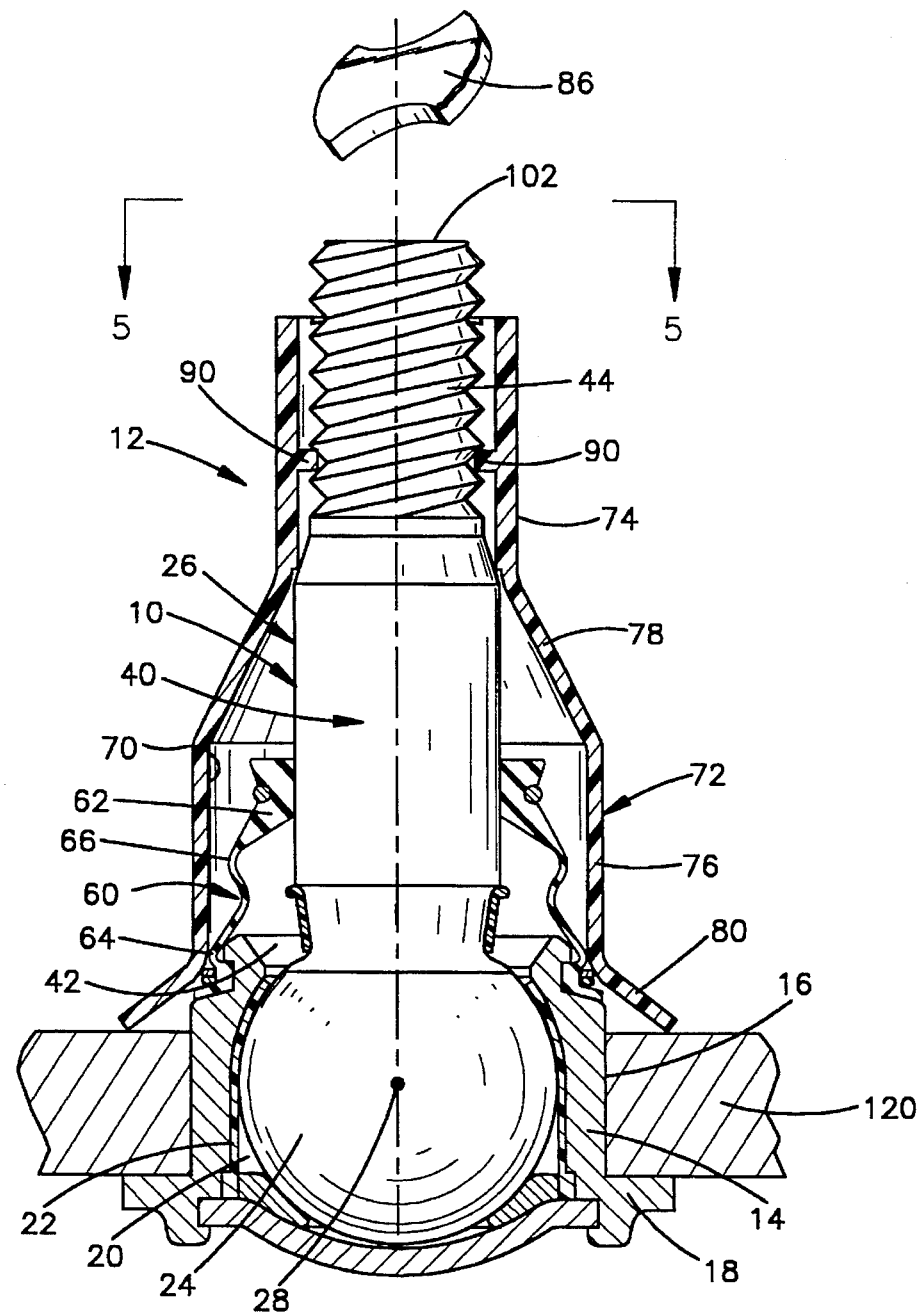
FIG. 4 is a sectional view, similar to FIG. 1, illustrating the ball joint assembly installed in a member with a cap of the protective cover removed.

A threaded stud of a ball joint assembly 10 (FIG. 1) is enclosed by a protective cover 12 constructed in accordance with the present invention. The ball joint assembly 10 includes a rigid metal socket 14 (housing) having a generally cylindrical sidewall 16 and a mounting flange 18. The socket 14 defines a socket chamber 20 within which is located a bearing 22. The socket 14 is preferably cold formed or screw machined from SAE grade 1008 or 1010 steel which is available from LTV Steel. The bearing 22 comprises two pieces preferably made of an injection molded Delrin® 500CL plastic which is available from E. I. DuPont De Nemours and Co.

The bearing 22 supports a spherical ball portion 24 of a ball stud 26. The bearing 22 supports the ball stud 26 for limited rotation and pivoting movement about a center of oscillation 28. The center of oscillation 28 is coincident with the center of the spherical ball portion 24 of the ball stud 26. The ball stud 26 is preferably cold formed or screw machined and then carbonized. The ball stud 26 is made of SAE grade 8115M or 8615 steel which is available from LTV Steel.

A shank portion 40 of the ball stud 26 projects through a circular opening 42 in the socket 14. A flexible boot seal member 60 seals the opening 42 between the ball stud 26 and the socket 14. The seal member 60 includes a shank seal portion 62 which seals against the shank portion 40 of the ball stud 26 and a socket seal portion 64 which seals against the socket 14. The shank seal portion 62 and the socket seal portion 64 are interconnected by a connector portion 66. The seal member 60 has a passage through which the ball stud shank portion 40 extends. The seal member 60 is formed of a suitable synthetic rubber or polymeric material, such as Compound #1806-85A urethane, which is available from Trostel.

The protective cover 12 is one-piece and made of a suitable elastomer or polymer material, preferably polyethylene. The protective cover 12 has a generally cylindrical chamber 70 which receives the shank portion 40 of the ball stud 26 and the seal member 60. The protective cover 12 encloses the shank portion 40 of the ball stud 26 and the seal member 60 to protect them from damage during handling and shipping.

The protective cover 12 includes a sidewall 72. The sidewall 72 has a cylindrical upper end portion 74, as viewed in FIG. 1, and a somewhat larger diameter cylindrical lower end portion 76. The upper and lower end portions 74 and 76 are interconnected by a frustoconical intermediate connector section 78.

A generally cylindrical skirt section 80 extends axially downward, (as viewed in FIG. 1) from the lower end portion 76 of the sidewall 72. The skirt section 80 includes a plurality of segments 82 which are separated by axially extending slots 84. The skirt segments 82 are easily deflected radially outward by engagement with the socket 14.

A pair of retaining elements 90 extend radially inward from the upper portion 74 of the sidewall 72 into engagement with a threaded end portion 44 of the ball stud 26. The retaining elements 90 engage the threaded end portion 44 at a minor diameter 92 (FIG. 2) of the threaded outer end portion. The retaining elements 90 hold the protective cover 12 against axial movement relative to the shank portion 40 of the ball stud 26 until it is desired to remove the cover. Deformable wall portions 94 of the side wall 72 interconnect the retaining elements 90.

A cap 86 is integrally formed with the cylindrical upper end portion 74 of the side wall 72. A thin web 96 (FIG. 3) attaches the cap 86 to the sidewall 72 of the upper end portion 74. The cap 86 engages an upper end surface 102 (FIG. 1) of the shank portion 40 of the ball stud 26 to axially position the cover 12 on the ball stud 26. When the cover 12 is to be placed on the ball stud 26, an upper surface 104 of the cap 86 is pressed downward, as viewed in FIG. 1, until the cap 86 engages the upper surface 102 of the shank portion 40. The web 96 will not break if the surface 104 of the cap 86 is pressed downward to place the cover on the ball stud 26.

After the ball joint assembly 10 has been fabricated, it is aligned with the cylindrical chamber 70 of the protective cover 12. Then the protective cover 12 is telescoped over the shank portion 40 of the ball stud 26 and seal member 60 until the cap 86 engages the surface 102 of the ball stud 26. The protective cover 12 then encloses the shank portion 40 of the ball stud 26 and the seal member 60. The retaining elements 90 of the protective cover 12 engage the threaded outer end portion 44 of the ball stud 26 at the minor diameter 92. The ball joint assembly 10 is encircled by the protective cover 12 and is protected from damage during handling and shipping.

The ball joint assembly 10 encircled by the protective cover 12 is then assembled onto a control arm 120. The protective cover 12 and the ball joint assembly 10 are then telescoped through a hole in the control arm 120 until the mounting flange 18 of the ball joint assembly 10 abuts the control arm 120 (FIG. 4).

Figure 5:
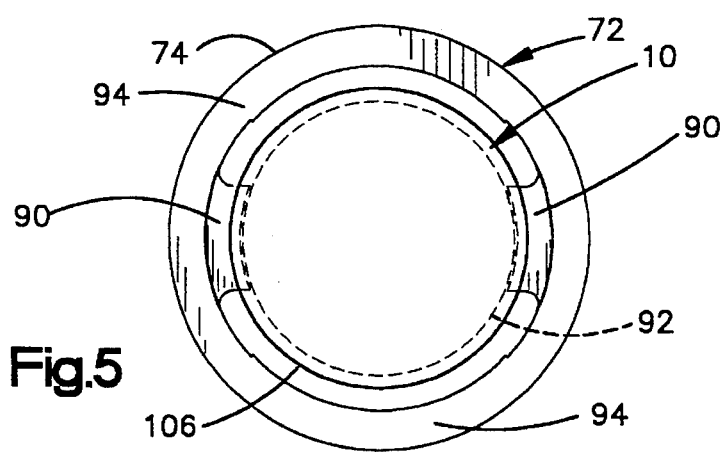
Fig. 5 is an enlarged view of the end of the protective cover, similar to FIG. 2, taken along the lines 5—5 of Fig 4.

When the control arm 120 is to be assembled with a vehicle, the protective cover 12 is moved axially toward the control arm 120 by pressing downward on the connector section 78 of the sidewall 72, as viewed in FIG. 4. As this movement occurs, the skirt segments 82 of the protective cover 12 resiliently deflect outward due to engagement with the socket 14 and the control arm 120. Also, as this movement occurs, the cap 86 engages the top portion 44 of the ball stud 26 causing the web 96 to break and release the cap from the cover 12, as seen in FIGS. 4 and 5.

To remove the protective cover 12 from the ball joint assembly 10, the deformable wall portions 94 are pressed toward each other, as seen in FIG. 7. By pressing the deformable wall portions 94 toward each other, the upper end portion 74 of the sidewall 72 takes on an oval configuration. The retaining elements 90 move radially outwardly and out of engagement with the ball stud 26. The retaining elements 90 move to a position in which the retaining elements are located radially outward from a major diameter 106 of the threaded end portion 44. The protective cover 12 can then be moved axially from the ball joint assembly 10.

From the above description of the invention, those skilled in the art will perceive improvements, changes and modifications in the invention. Such improvements, changes and modifications within the skill of the art are intended to be covered by the appended claims.

Having described the invention, the following is claimed:

1. A protective cover for a ball joint assembly having a socket with a ball stud and a seal between the socket and ball stud, said cover comprising:

a generally cylindrical side wall for enclosing the stud;

radially inwardly extending retaining means on said side wall for engaging a shank of the stud to prevent removal of said cover from the ball joint assembly, said retaining means having a first position in which said retaining means engages the stud to resist removal of said cover from the ball joint assembly and a second position in which said retaining means is moved radially outwardly of the stud to permit removal of said cover from the ball joint assembly; and means for preventing said retaining means from moving from its first position to its second position, said preventing means comprising a removable part connected with said side wall, said retaining means being movable from its first position to its second position when said removable part has been removed from said side wall.

2. A protective cover as set forth in claim 1 wherein said removable part comprises a cap connected with said side wall and partially enclosing the stud.

3. A protective cover as set forth in claim 2 wherein said cap can engage an end surface of the stud to axially position said cover on the ball joint assembly.

4. A protective cover as set forth in claim 2 wherein said cap is removable from said cover in response to axial movement of said cover relative to the ball joint assembly.

5. A protective cover as set forth in claim 1 wherein said retaining means includes a retaining element extending radially inward from said side wall, said retaining element being engageable with the stud.

6. A protective cover as set forth in claim 5 wherein said retaining means includes a pair of retaining elements extending radially inward and in opposite directions from said side wall, said pair of retaining elements being engageable with the stud.

7. A protective cover as set forth in claim 6 wherein said retaining elements are interconnected by two deformable wall portions of said side wall, said deformable wall portions being movable toward each other upon the application of radially inwardly directed forces on said deformable wall portions to move said retaining elements away from each other and out of engagement with the stud when said removable part has been removed from said cover.

8. A protective cover as set forth in claim 7 wherein said removable part includes means for preventing said deformable wall portions from being moved toward each other.

9. A protective cover as set forth in claim 5 wherein said retaining element will engage the stud at a minor diameter of a threaded portion of the stud.

10. A protective cover as set forth in claim 9 wherein said retaining element is movable from a position engaging the threaded portion at the minor diameter to a position located radially outward of a major diameter of the threaded portion.

11. An apparatus comprising:

a socket;

a ball stud having a shank portion extending from said socket;

a seal between said shank portion and said socket; and a protective cover comprising walls defining a chamber for receiving said shank portion and said seal, said cover having a retaining means for preventing removal of said cover, said retaining means having a first position in which said retaining means engages said stud and resists removal of said cover and a second position in which said retaining means is moved radially outwardly of said stud to permit removal of said cover, and means for preventing said retaining means from moving from its first position to its second position, said preventing means comprising a removable part connected with said cover, said retaining means being movable from its first position to its second position when said removable part has been removed from said cover.

12. An apparatus as set forth in claim 11 wherein said removable part comprises a cap partially enclosing said stud and engageable with said stud to axially position said cover on said stud, said cap being removable from said cover in response to axial movement of said cover relative to said stud.

13. An apparatus as set forth in claim 12 wherein said stud includes a threaded portion having a minor diameter and a major diameter, said retaining means including a pair of retaining elements extending radially inward and in opposite directions from said wall defining the chamber, said retaining elements being engageable with said stud at the minor diameter of said threaded portion, said retaining elements being interconnected by two deformable wall portions of said walls, said retaining elements being movable from a position engaging the stud at the minor diameter of said threaded portion to a position located radially outward of the major diameter of said threaded portion in response to radially inwardly directed forces applied to said deformable wall portions to move said deformable wall portions radially inward.

* * * * *